United States Patent [19]
Segoshi et al.

[11] Patent Number: 4,656,563
[45] Date of Patent: Apr. 7, 1987

[54] AUTOMOTIVE VEHICLE STOPLIGHT ARRANGEMENT

[75] Inventors: Toru Segoshi, Yokohama; Takasi Nomoto, Ebina, both of Japan

[73] Assignee: Nissan Motor Co., Ltd., Japan

[21] Appl. No.: 804,143

[22] Filed: Dec. 3, 1985

[30] Foreign Application Priority Data

Dec. 3, 1984 [JP] Japan .................. 59-254071

[51] Int. Cl.<sup>4</sup> .............................................. B60Q 1/00
[52] U.S. Cl. ...................................... 362/61; 362/80; 340/87
[58] Field of Search ............... 362/61, 80, 74; 340/87, 340/97, 89, 84; 298/99 R

[56] References Cited

U.S. PATENT DOCUMENTS

| | | | |
|---|---|---|---|
| 4,373,153 | 2/1983 | Sano et al. | 340/87 |
| 4,449,167 | 6/1984 | Cohen | 362/61 |
| 4,515,393 | 5/1985 | Sauter | 362/61 |

FOREIGN PATENT DOCUMENTS

| | | | |
|---|---|---|---|
| 0051086 | 5/1982 | European Pat. Off. | 362/61 |
| 2927068 | 2/1980 | Fed. Rep. of Germany | 296/107 |
| 57-74237 | 5/1982 | Japan . | |

OTHER PUBLICATIONS

"Parts & Accessories", Pickup Truck Covers, p. 43, 1983.

Primary Examiner—William A. Cuchlinski, Jr.
Assistant Examiner—D. M. Cox
Attorney, Agent, or Firm—Leydig, Voit & Mayer

[57] ABSTRACT

An automotive vehicle body consists of a body shell detachable to form an opening in the vehicle body. A first stoplight is installed to the body shell and capable of lighting when the body shell is located in position. A second stoplight is installed inside a roof section and to a roll bar of the vehicle body, so that braking of this vehicle can be immediately and clearly signalled to succeeding automotive vehicles even in a state in which the body shell is detached from its position.

17 Claims, 5 Drawing Figures

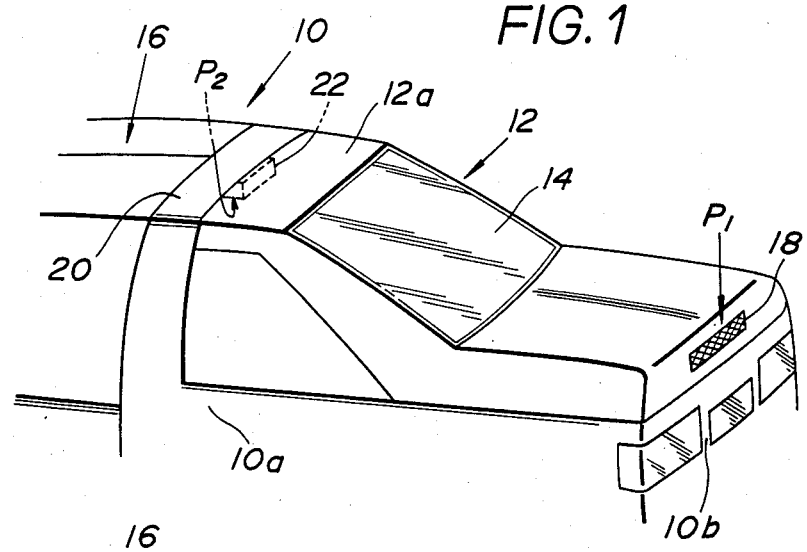
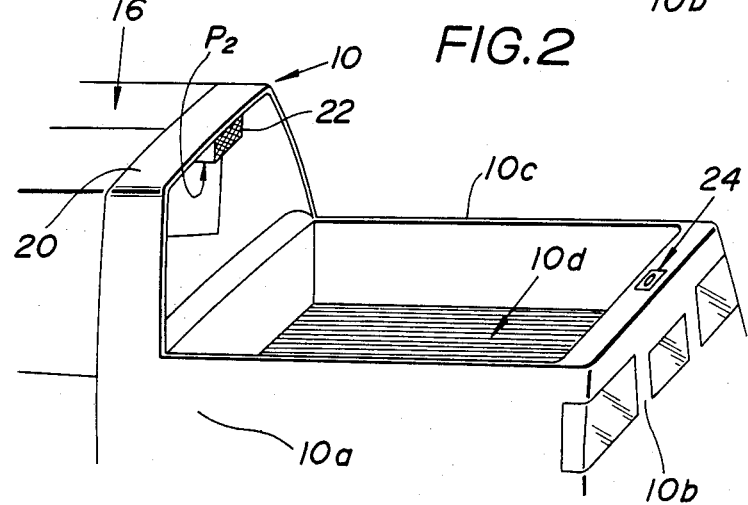
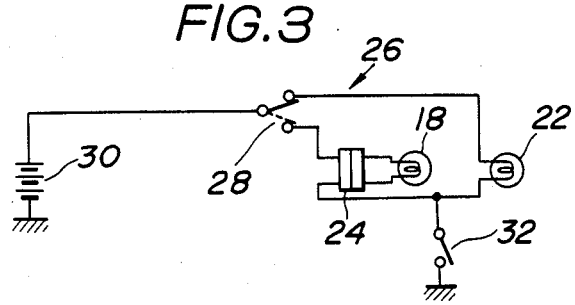

AUTOMOTIVE VEHICLE STOPLIGHT ARRANGEMENT

BACKGROUND OF THE INVENTION

1. Field of the Invention

This invention relates generally to an automotive vehicle of the type wherein at least a part of upper-half of a vehicle body is so configured as to be detachable or foldable, and more particularly to a stoplight arrangement in an automotive vehicle of this type.

2. Description of the Prior Art

In order to signal the braking of a motor vehicle to following automotive vehicles as quickly as possible, a stoplight arrangement has been recently proposed in which stoplights are disposed, in addition to usual stoplights located at the vehicle body rear section, in a location higher than that of the usual stoplights, for example, on a rear windshield.

However, the following drawbacks have been encountered in such a stoplight arrangement in case of a motor vehicle of the type wherein not only a rear windshield but also at least a part of or whole a vehicle roof section including the rear windshield is detachable or foldable to form an opening at the upper-half of the vehicle body. In the vehicle where at least a part of or whole the vehicle roof section is detachable, the stoplights are unavoidably removed from the vehicle body when the vehicle roof section has been detached. In a vehicle where at least a part of or the whole of the vehicle roof section is foldable by means of a folding hood or the like, the stoplights are unavoidably covered with the folded hood when the roof section has been folded thereby making impossible to signal the braking of the vehicle to the succeeding vehicle.

To solve the above-mentioned drawbacks, it may be suggested to dispose the stoplights on a rear parcel shelf or inside the rear windshield. However, in this case, a relatively large-sized shade members are required to be disposed between the stoplights and the windshield to prevent the reflection of light from the stoplights on the surface of the windshield. This leads to disadvantages from economical viewpoint due to necessity of the shade members and from operational viewpoint due to the fact that the shade members narrow the rear sight of the vehicle.

SUMMARY OF THE INVENTION

An automotive vehicle of the present invention is composed of a vehicle body comprising a movable roof section such as a detachable body shell or a folding hood, for covering an opening formed in the vehicle body. A first stoplight is installed on the movable roof section in a first position and capable of being lighted when the roof section is in position to close the opening. Additionally, a second stoplight is installed on the vehicle body in a second position and capable of being lighted when the roof section is moved to form the opening. The first and second positions are considerably separate from each other.

Accordingly, even in the automotive vehicle of the type having at least a part of or the whole of the upper-half of the vehicle body is openable, braking of the automotive can be immediately and clearly signalled to following automotive vehicles regardless of the covered or uncovered condition of the upper-half of the vehicle body.

BRIEF DESCRIPTION OF THE DRAWINGS

The features and advantages of the automotive vehicle according to the present invention will be more clearly appreciated from the following description taken in conjunction with the accompanying drawings in which like reference numerals designate corresponding parts and elements, in which:

FIG. 1 is a fragmentary perspective view of an embodiment of an automotive vehicle according to the present invention, showing a first state in which a body shell is installed in position;

FIG. 2 is a fragmentary perspective view of the automotive vehicle of FIG. 1, but showing a second state in which the body shell is detached from its position;

FIG. 3 is a wiring diagram of an electric circuit for first and second stoplights of the vehicle of FIG. 1;

DETAILED DESCRIPTION OF THE INVENTION

Figure 4:
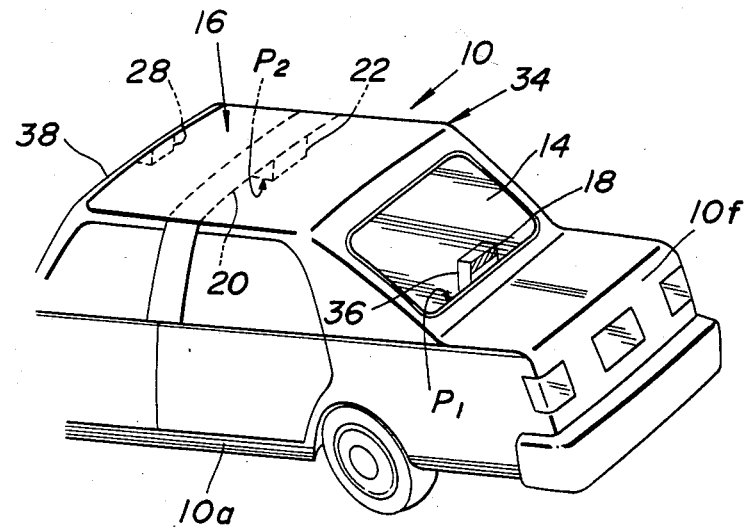
FIG. 4 is a fragmentary perspective view of another embodiment of the automotive vehicle according to the present invention, showing a first state in which a hood is extended to form a roof.

Referring now to FIGS. 1 to 3 of the drawings, an embodiment of an automotive vehicle of the present invention is shown comprising a vehicle body 10 which includes a portion 10a formed with a rear end panel 10b. The vehicle body 10 further includes a movable roof section herein shown as a body shell 12 which is detachably installed to the vehicle body portion 10a. The body shell 12 is formed with a rear windshield 14, and a rearmost part 12a of a roof section 16. The body shell 12 is provided with a first stoplight 18 which is located in a first position $P_1$ lying at the rear end section thereof. The first stoplight 18 in the first position $P_1$ can be clearly seen from the rear of the vehicle. The body shell 12 can be detached as shown in FIG. 2 to form an opening 10c in the vehicle body 10. The opening 10c is defined by the periphery of the vehicle body portion 10a and located between the rear end panel 10b and a roll bar 20. The roll bar 20 forms part of the vehicle body proper 10a and also of the roof section 16 and serves as a reinforcement member in the event that the vehicle rolls. A bed or carrier 10d for goods is located inside the vehicle body proper 10a.

As shown in FIG. 2, a second stoplight 22 is installed to the inner surface of the roll bar 20 and located in a second position $P_2$ in which the stoplight can be clearly seen from the rear of the vehicle upon the body shell 12 being detached to leave the opening 10c. The rear end panel 10b is provided at its upper periphery with a connector 24 through which an electric circuit 26 for lighting the first stoplight 18 in the body shell 12 can be formed.

The electric circuit 26 shown in FIG. 3 includes a selection switch 28 of the change-over type which functions to selectively connect an electric source or battery 30 to one of the first and second stoplights 18, 22 which are parallelly connected with each other. Each stoplight 18, 22 has two terminals one of which is connectable with the battery through the selection switch 28 and the other connected to a brake pedal operated switch 32. Accordingly, the selection switch 28 is in a position indicated by a broken line in FIG. 3 in case where the body shell 12 is installed to the vehicle body portion 10a as shown in FIG. 1 thereby lighting the first stoplight 18 upon depressing a brake pedal (not shown) to slow down or stop vehicle, whereas the selection switch 28 is in another position indicated by a solid line in FIG. 3 in case where the body shell 12 is detached from the vehicle body portion 10a as shown in FIG. 2 thereby lighting the second stoplight 22 upon depressing the brake pedal. It will be understood that the selection switch 28 may be automatically changed in accordance to the installation or detaching operation of the body shell 12, in which the selection switch 28 is so arranged as to be changeable in its position upon receiving the depression force applied from the side of the body shell 12 at the location of the connector 24 so that the second stoplight 22 is lightable as shown in FIG. 3 in the state where the body shell 12 is detached to release the depression force.

The manner of operation of the thus arranged vehicle will be discussed hereinafter.

When the body shell 12 is installed in position, the first stoplight 18 can be clearly seen from the rear of the vehicle as shown in FIG. 1. At this time, the second stoplight 22 is always switched OFF so as not to light even upon braking operation of the vehicle. Accordingly, a shade for the second stoplight is unnecessary. In contrast with this, when the body shell 12 is detached from the vehicle body portion 10a as shown in FIG. 2, the second stoplight 22 becomes clearly visible from the rear of the vehicle. At this time, since the first stoplight 18 has been removed together with the body shell 12, the appearance design of the vehicle body 10 is good.

Additionally, the change-over operation of the selection switch 28 of the electric circuit 26 is made automatically without requiring any manual operation. However, it will be understood that the change-over operation of the selection switch 28 may be made manually.

Figure 5:
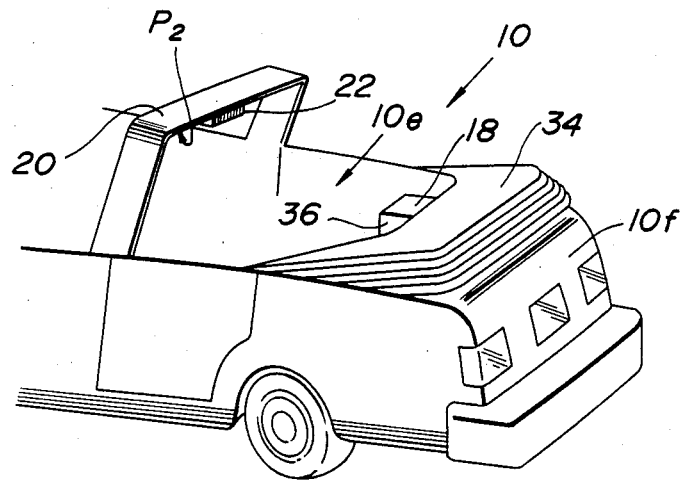
FIG. 5 is a fragmentary perspective view of the vehicle of FIG. 4, but showing a second state in which the hood is folded.

FIGS. 4 and 5 show another embodiment of the automotive vehicle of the present invention which is similar to the embodiment of FIGS. 1 to 3 with the exception that the movable roof section 16 is constituted of a folding hood 34. In this embodiment, an electric circuit for controllably lighting the first and second stoplights 18, 22 is similar to that shown in FIG. 3 and therefore is omitted for the purpose of simplicity of illustration.

As shown in FIG. 4, the first stoplight 18 is located in the first position P₁ where the stoplight 18 can be clearly seen from the rear of the vehicle. The first position P₁ lies in a so-called rear parcel, i.e., behind a rear seat 10e and in front of the rear windshield 14. Accordingly, the first stoplight 18 is so located as to be seen through the rear windshield 14 from the rear of the vehicle. In this connection, an arm 36 for supporting the first stoplight 18 is required to bring the first stoplight 18 near the rear windshield 14; however, the arm 36 is relatively short since it is not necessary that the first stoplight 18 cannot be seen from the rear when the hood 34 is folded as shown in FIG. 5. In this embodiment, the selection switch 28 of the electric circuit 26 for controllably lighting the first and second stoplights 18, 22 is installed to a front roof rail 38 with which a front end of the hood 34 is brought into press contact.

The second stoplight 22 is located in the second position P₂ where the stoplight 22 can be clearly seen from the rear of the vehicle in the state where the hood 34 is folded as shown in FIG. 5. The second position P₂ lies below the roll bar 20 same as in the embodiment of FIGS. 1 to 3. More specifically, the second stoplight 22 is installed on the lower surface of the roll bar 20. The configuration of the second stoplight 22 is the same as that in FIG. 2. As seen from FIG. 5, the first stoplight 18 is covered with the folded hood 34 and becomes out of sight in the state where the hood 34 is folded. It will be understood that the vehicle of this embodiment is so configurated that the rear seat 10e is exposed upon folding the hood 34.

In operation of the vehicle shown in FIGS. 4 and 5, a driver (not shown) manually operates the selection switch 28 to select the position indicated by the broken line in FIG. 3 in the state where the hood 34 is in position to form the roof section 16 as shown in FIG. 4. In this condition, the first stoplight 18 is lighted in response to braking operation of the vehicle, so that the lighted first stoplight 18 can be clearly seen from the rear of the vehicle. At this time, the second stoplight 22 is always switched OFF and therefore no particular measure for preventing leaking of light from the stoplight is necessary. Additionally, in this embodiment using the folding hood 34 as the roof section 16, an elastic action is made between the first stoplight 18 and the rear windshield 14, so that it is possible to locate the first stoplight 18 in contact with the rear windshield 14. This makes unnecessary to take any measure for preventing light leaking due to, for example, light reflection on the inner surface of the rear windshield 14.

In the state where the hood 34 is folded on a rear end section 10f of the vehicle body 10 as shown in FIG. 5, the first stoplight 18 is covered with the folded hood 34 and is out of sight while the second stoplight 22 installed to the roller bar 20 becomes clearly seen from the backward of the vehicle. Then, the driver manually operates the selection switch 28 to change the position of switch 28 into that indicated by the solid line FIG. 3, so that the second stoplight 22 can be lighted upon braking operation of the vehicle.

While the selection switch 28 in this embodiment has been described as being operated manually, it will be understood that the selection switch 28 may be automatically operated in response to extending or folding operation of the hood 34.

Although only two types of vehicles using the detachable body shell 12 and the folding hood 34 have been shown and described in the above, it will be understood that the principle of the present invention is applicable to all automotive vehicles of the types wherein a vehicle body is provided with a movable section to form an opening in the vehicle body, in which suitable stoplight arrangements can be designed in accordance with conditions where the movable section is located in open or closed positions.

Therefore, the first stoplight capable of lighting upon the movable section being located in closed position is not required to light when the movable section is moved to open position, and therefore no attention is necessary except for avoiding an obstruction of the first stoplight on cargo loading and unloading operation in this state. Similarly, the second stoplight capable of lighting upon the movable section being moved to open position is not required to light when the movable section is in closed position, and therefore no attention is necessary except for avoiding an obstruction of the second stoplight on cargo loading and unloading operation in this state. Thus, the stoplight arrangement of the present invention is greater in freedom of design thereby making possible a variety of designs applicable to wider uses taking account of the type of the movable section of the vehicle body, the design of appearance of the vehicle body and the like.

What is claimed is:

1. An automotive vehicle comprising:
a vehicle body including a vehicle shell having a section which is openable to form an opening in said vehicle body;
a first stoplight installed to said vehicle shell in a first position and connected to an electric circuit to be lighted when said section is moved to a closed position to close said opening; and
a second stoplight installed to said vehicle shell in a second position and connected to an electric circuit to be lighted when said section is moved to an open position to form said opening, said first position being lower than said second position and said positions being separate from each other, said first stoplight in said first position being clearly seen from said automotive vehicle when said section is in the closed position, and said first stoplight in said first position being blocked from being clearly seen from behind said automotive vehicle when said section is in the open position.

2. An automotive vehicle according to claim 1 wherein said electric circuit includes said first and second stoplights, a brake-pedal-operated switch electrically connected to said first and second stoplights and arranged to close when a brake pedal is depressed to brake the vehicle, and a selection switch having a first position where an electric source is connected to said first stoplight, and a second position where the electric source is connected to said second stoplight, said selection switch being in said first position when said section is in the closed position and being switched to said second position when said section is in the open position.

3. An automotive switch according to claim 2 wherein the selection switch is a manually operated switch.

4. An automotive vehicle according to claim 1 wherein said section is a foldable hood including a rear windshield and a rear part of a roof section, said first stoplight being located inside and near said rear windshield, and said second stoplight being located inside of said hood and installed on a roll bar forming part of said vehicle roof section.

5. An automotive vehicle according to claim 4 wherein said vehicle body includes a rear end section and a front roof rail to which front end of said hood is connected, and said opening is defined between said rear end section and said front roof rail.

6. An automotive vehicle according to claim 5 wherein said selection switch of said electric circuit is installed on said front roof rail and arranged to be manually operated to take one of said first and second switch positions.

7. An automotive vehicle comprising:
a vehicle body having a movable roof section which is openable to form an opening in said vehicle body;
a first stoplight installed on said movable roof section and connected to an electric circuit to be lighted when said roof section is moved to a closed position to close said opening; and
a second stoplight installed on said vehicle body in a second position and connected to an electric circuit to be lighted when said roof section is moved to an open position to form said opening, said first and second positions being separate from each other.

8. An automotive vehicle according to claim 7 wherein said first position is located lower than said second position.

9. An automotive vehicle according to claim 7 wherein said first stoplight in said first position is clearly seen from the rear of said automotive vehicle when said roof section is in the closed position.

10. An automotive vehicle according to claim 7 wherein said second stoplight in said second position is clearly seen from behind said automotive vehicle when said section is in the open position.

11. An automotive vehicle according to claim 7 wherein said roof section is a body shell detachable from said vehicle body and including a rear windshield and a rear part of a roof of the vehicle, said first stoplight being installed on a rear end section of said body shell and said second stoplight being installed on a roll bar forming part of said roof section.

12. An automotive vehicle according to claim 11 wherein said vehicle body includes a rear end panel connectable through a connector with said body shell rear end section, and said opening is defined between said rear end panel and said roll bar.

13. An automotive vehicle according to claim 12 wherein said selection switch of said electric circuit is switched to said first position in response to connection through said connector between said vehicle body rear end panel and said body shell rear end section.

14. An automotive vehicle according to claim 7 wherein said electric circuit includes said first and second stoplights, a brake-pedal-operated switch electrically connected to said first and second stoplights and arranged to close when a brake pedal is depressed to brake the vehicle, and a selection switch having a first position where an electric source is connected to said first stoplight, and a second position where the electric source is connected to said second stoplight, said selection switch being in said first position when said section is in the closed position and being switched to said second position when said section is in the open position.

15. An automotive vehicle according to claim 14 wherein the selection switch is a manually operated switch.

16. An automotive vehicle comprising:
a vehicle body including a vehicle shell having a section which is openable to form an opening in said vehicle body;
a first stoplight installed to said vehicle shell in a first position and connected to an electric circuit to be lighted when said section is moved to a closed position to close said opening; and
a second stoplight installed on said vehicle shell in a second position and connected to an electric circuit to be lighted when said section is moved to an open position to form said opening, said first position being lower than said second position and said second positions being separate from each other, said first stoplight in said first position being clearly seen from behind said automotive vehicle when said section is in the closed position, and said first stoplight in said first position being blocked from being clearly seen from behind said automotive vehicle when said section is in the open position, said electric circuit comprising said first and second stoplights, a brake-pedal-operated switch electrically connected to said first and second stoplights and arranged to close when a brake pedal is depressed to brake the vehicle, and a selection switch having a first position where an electric source is connected to said first stoplight, and a second position where the electric source is connected to said second stoplight, said selection switch being in said first position when said section is in the closed position and being switched to said second position when said section is in the open position.

17. An automotive vehicle according to claim 16 wherein the selection switch is a manually operated switch.

* * * * *